May 6, 1952   W. L. J. DE NIE ET AL   2,595,831
PROCESS FOR DISINTEGRATING CONGLOMERATES OF POLYMER PARTICLES
Filed Sept. 16, 1948
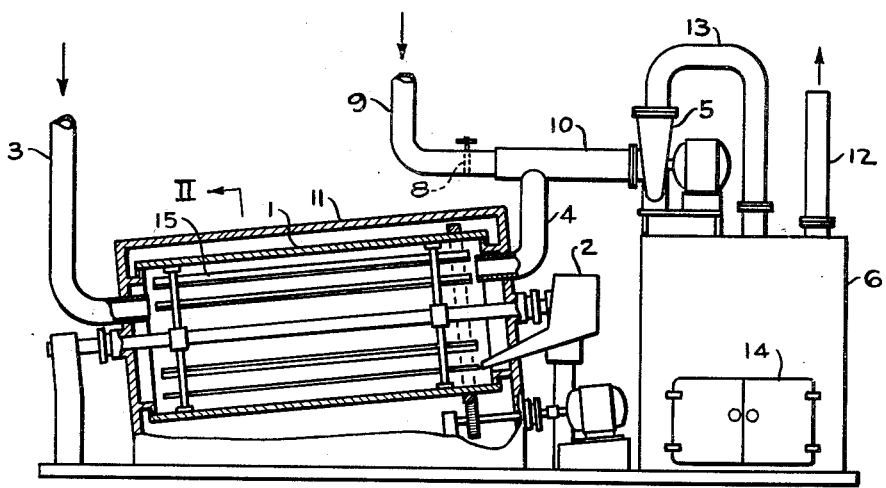
FIG. I
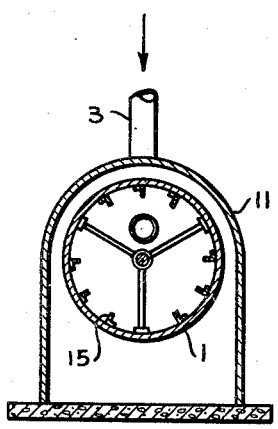
FIG. II
INVENTORS:
WILLEM LEENDERT JOHANNES DE NIE
RUDOLF HERMAN METTIVIER MEIJER
BY:
THEIR ATTORNEY Patented May 6, 1952

2,595,831

UNITED STATES PATENT OFFICE 2,595,831

PROCESS FOR DISINTEGRATING CONGLOMERATES OF POLYMER PARTICLES

Willem Leendert Johannes de Nie, London, England, and Rudolf Herman Mettivier Meijer, Amsterdam, Netherlands, assignors to Shell Development Company, San Francisco, Calif., a corporation of Delaware Application September 16, 1948, Serial No. 49,656
In the Netherlands September 18, 1947

20 Claims. (Cl. 260—96)

This invention relates to the disintegration of conglomerates or lumps of polymer particles. More particularly the invention relates to a novel process for the disintegration of liquid-containing conglomerates or lumps of polymer particles, such as are obtained after the separation of the coagulated latex in the aqueous emulsion polymerization processes, to form a finely powdered mass which may be easily processed for the production of improved molding compositions and the like.

More specifically the invention provides a very practical and highly efficient method for the disintegration of liquid-containing conglomerates or lumps of polymer particles to form a finely powdered mass which comprises subjecting the said conglomerates or lumps to a mechanical agitation treatment, such as described hereinafter, and simultaneously, either entirely or partially, removing the liquid from the surface of the small polymer grains.

Aqueous emulsion polymerization is usually preferred over the old bulk or solvent polymerization methods as it in most cases may be accomplished at a lower cost, is more easily controlled and produces a better quality of polymer. The aqueous emulsion polymerization processes have, however, a serious drawback which has hindered their use for large scale commercial production of the polymers, particularly if the product to be produced is formed in non-rubber like grains. It has been found that when many of the non-rubber like polymers are produced in the aqueous emulsion process the polymer grains obtained after the separation of the coagulated latex tend, when wet, to adhere together to form large cakes or lumps and the presence of these lumps greatly impedes the further processing of the polymer. The difficulties encountered in the further processing of these wet polymer cakes have been so great in some cases that the method of polymerization has been replaced by the more expensive "pearl polymerization" process in which the cake formation is not so serious a problem.

It is an object of the invention, therefore, to provide a method for obtaining finely powdered, easily processable polymer particles from the wet polymer cakes obtained from the aqueous emulsion polymerization process and thus enable the art to utilize this highly desired polymerization process to full advantage. It is a further object of the invention to provide a method for the disintegration of liquid-containing conglomerates or lumps of non-rubber like polymer particles into a finely powdered mass which may be easily processed. It is a further object of the invention to provide a method for the disintegration of liquid-containing conglomerates or lumps of polymer particles to form a powdered mass which may be accomplished at a low cost and with a relatively high degree of efficiency. It is still a further object of the invention to provide a method for the conversion of wet non-rubber like polymer cakes into a finely powdered mass which may be easily processed to produce improved molding compositions and the like. These and other objects and advantages of the invention will be understood from the following detailed description thereof and from the accompanying drawing wherein Figure I illustrates one embodiment of an apparatus in which the process of the invention may be carried out, and Figure II is a cross-sectional view taken along line II—II in Figure I.

It has now been discovered that these and other objects may be readily accomplished by the novel process of the invention which comprises subjecting the liquid-containing conglomerates or lumps of polymer particles to a mechanical agitation treatment, such as described hereinafter, and simultaneously either entirely or partially, removing the liquid from the surface of the small polymer grains. By this process the wet cakes of polymer particles are readily converted to a finely powdered mass in which the individual particles no longer adhere to each other and the resulting powder may easily be processed. As a result the highly desired aqueous emulsion polymerization processes may now be utilized successfully on large commercial scales to produce the desired molding compositions and the like.

The lumps of polymer particles which may be utilized in the process of the invention may be comprised of any polymeric material which exists in granular form having a tendency to adhere together when wet, i. e. any of the non-rubber like polymers. The borderline between rubber like and non-rubber like is assumed to be in a product with an elongation at rupture of 100%. Consequently, the invention relates to the treatment of polymers which already break at an elongation of less than 100%. Included within this group of non-rubber like polymeric material are the urea-aldehyde type polymers, the polyamides, polymers of the cellulose esters, polymers of methyl acrylate, methyl methacrylate, vinyl chloride, vinyl bromide, acrylonitrile, methacrylonitrile, vinyl acetate, vinyl benzoate, divinyl succinate, vinyl allyl phthalate, and divinyl adipate, the vinylidene halides, such as vinylidene chloride and vinylidene bromide.

A preferred group of polymers to be used in producing the liquid-containing conglomerates comprise the members of the group consisting of the polymers of the vinylidene halides, the alkyl esters of acrylic acid and alpha-alkyl substituted acrylic acids, the vinyl esters of the acrylic acid and alpha-alkyl substituted acrylic acids, the vinyl esters of the halogen acids and hydrocyanic acid, and styrene. Examples of this preferred group of polymers are the polymers of vinylidene chloride, vinylidene bromide, acrylonitrile, methyl acrylate, methyl methacrylate, butyl acrylate, vinyl acrylate, vinyl chloride, vinyl bromide, and styrene.

Any type liquid may be used in producing the conglomerates of the above described granular polymers. The liquids which will usually be present in the cakes of the polymer particles are those liquids utilized during the preparation of the polymers, e. g. in case the polymers are prepared in a solvent polymerization process the liquid adhereing to the particles will be solvents, such as the alcohols, ketones, ethers, hydrocarbons, and the like, and in the case of the aqueous emulsion polymerization the liquid adhering to the polymer particles will be water. As this latter method is the more preferred process to be used in producing the polymer cakes, water will be the preferred liquid contained in the said polymeric cakes.

The amount of the liquid contained in the conglomerates or lumps of the polymer particles will vary over a considerable range depending upon the particular method of preparation of the polymer particles, the particular type polymer being utilized, and the method of separation utilized for recovering the polymers from the reaction mixture. In most cases the amount of liquid present in the conglomerates will vary between about 40% to about 65% by weight of the polymer. Conglomerates containing higher or lower amounts of liquid may be utilized, however, in the process if desired or necessary.

The liquid-containing conglomerates of polymer particles to be disintegrated by the process of the invention may be produced by any suitable method. The advantages of the process are more apparent, however, when the wet polymer lumps utilized are those obtained from the aqueous emulsion polymerization processes.

Any suitable aqueous polymerization method may be used to produce the preferred conglomerates but the one usually preferred comprises adding the material to be polymerized to a mixture containing water, emulsifying agent, polymerization catalyst, and pH adjuster, subjecting the resulting mixture to the desired temperature and pressure to form the polymer latex, coagulating the latex and separating the polymer particles from the reaction mixture.

Suitable emulsifying agents which may be used for the preferred process comprise the soaps, such as sodium and potassium myristate, laurate, palmitate and stearate; the alkali metal alkyl or alkylene sufates, such as sodium lauryl sulfate; the alkali metal alkyl, alkylene or alkylaryl sulfonates, for example sodium lauryl sulfonate; sulfonated mineral oil, and the like. The amount of the emulsifying agent utilized will vary over a considerable range depending upon the various conditions but in most cases it will vary between about 0.1% to about 6% by weight of monomer.

Examples of polymerization catalysts that may be used in the preferred polymerization process comprise the per-acids, such as persulfuric acid, peracetic acid, and perphthalic acid, the per-salts, such as potassium persulfate, the peroxide catalysts, such as hydrogen peroxide, benzoyl peroxide, succinyl peroxide, and the like. The amount of the catalyst employed will usually vary between about .01% to 5% by weight of monomer. A preferred amount of catalyst will vary between about .01% to 2% by weight.

Suitable pH adjusters include such substances as trisodium phosphate, sodium carbonate, disodium hydrogen phosphate and calcium carbonate.

The amount of water added to the aqueous emulsion will vary over a considerable range depending upon the particular conditions of reaction. In most cases it is desirable to maintain the ratio of the material to be polymerized to water smaller than 1 to 2.

Temperatures to be employed in the preferred aqueous emulsion polymerization process will preferably vary between 0° C. to 40° C. although they sometimes may be allowed to go much higher or lower. The polymerization may be conducted under atmospheric, superatmospheric or subatmospheric pressures.

The polymer will be formed in the aqeuous emulsion in the form of a latex which may readily be coagulated by the addition of electrolytes, solvents, by dehydration, freezing, and the like. The more preferred method is to coagulate the latex by the addition of electrolytes, such as sodium chloride. After the coagulation the polymer particles may be removed from the reaction mixture by any suitable means, such as filtration, dehydration, and the like. During this step the wet polymer grains will begin to form into the conglomerates or lumps which are to be used in the process of the invention.

The mechanical agitation treatment to which the above-described liquid-containing conglomerates of polymer particles are to be subjected according to the process of the invention may be any mechanical operation which will cause a physical disintegration of the conglomerate into smaller particles. Examples of such mechanical treatments are dropping, turning, crushing, shaking, knocking, beating, scratching, filing, pulverizing, grinding and the like. The intensity of the mechanical agitation should be such that there will be the greatest possible quantity of separate small polymer grains formed during the operation.

The mechanical agitation is preferably carried out in a roating drum equipped with a horizontal or slightly inclined shaft, in which the material to be treated is repeatedly entrained by the wall over a certain distance and then falls back again. Vanes which are attached to the inner wall of the drum, leaving an open space in the centre, greatly promote the entrainment of the polymer by the wall. It is preferred to fit these vanes radially. The inclined position of the shaft has the advantage that the material is gradually moved through the drum in the direction of the shaft, which is of particular importance when the process is carried out continuously.

The removal of the liquid from the surface of the small polymer particles making up the conglomerate, which is to be accomplished simultaneously with the above-described mechanical agitation treatment, may be accomplished by any suitable method. The removal of the surface liquid is preferably accomplished by carrying out the above-described mechanical treatment in an atmosphere which readily absorbs the said liquid. Examples of atmospheres which are well suited for this purpose are air, oxygen, nitrogen, carbon dioxide and other similar gases.

It may be desirable in some cases to subject the atmosphere used for the removal of the surface liquid to a preliminary treatment in order to increase its ability to absorb the particular liquid on the polymer grains. For example, it is usually advisable in some cases to raise the temperature of the atmosphere to increase its absorption power. In general, raising the temperature of the atmosphere to between 50° C. and 90° C. is sufficient. Higher temperatures may be used, however, if they have no detrimental effect on the polymer particles being disintegrated.

As stated above all or only part of the liquid present on the surface of the polymer particles need be removed during the operation of the process. The exact amount of liquid to be removed will depend in each case upon the nature of the polymer involved, the method employed for removing the liquid, the purpose for which the resulting polymer grains are to be utilized, etc. In most cases, however, it is usually preferred to remove substantially all of the liquid present on the surface of the small polymer grains.

In those cases where a current of gas is utilized to remove the liquid from the surface of the polymer particles the resulting dried polymer grains may advantageously be carried out with the gas and may be collected in a chamber. In other instances the polymer grains may be removed in mass from the apparatus utilized for the mechanical agitation treatment. In all cases, however, the polymers will be obtained as a finely powdered mass in which the separate polymer grains do not stick together and the said mass may be easily subjected to the required processing steps to prepare the necessary molding compositions and the like.

An important feature of the invention is contained in the fact that the dried powdered mass obtained from the above-described disintegration process may readily be subjected to a subsequent surface sintering process without danger of any damage to the said polymer particles. The term "sintering" as used throughout the specification and appended claims is meant the step of improving the properties of the individual polymer grains by effecting a slight softening of the said polymer particles only at the surface thereof. In this operation the particles are not fused to one solid mass as in the usual sintering process but the product still remains in the form of fine polymer grains. Surface sintering of polymer particles has proved to be a very important step in the preparation of polymer grains for processing as such a process greatly improves the ability of the polymer grains to be incorporated with plasticizers, improves the properties of the resulting molded articles, etc. The liquid-containing conglomerates obtained by the aqueous emulsion process cannot be subjected to this desirable process as it results inevitably in the destruction of many of the favorable characteristics of the polymer particles.

Surface sintering of the powdered mass produced by the process described above may be accomplished by any desired method. The more preferred process comprises exposing the said powdered mass immediately after being removed from the disintegration process to a hot gas, which is maintained in motion or is stationary, for only a relatively short period of time.

Suitable gases for use in the preferred surface sintering process comprise air, nitrogen, carbon dioxide and the like. The high temperature of the gas will vary over a considerable range depending upon the type of polymer being treated, etc. In general, the initial temperature of the gas will vary between about 160° C. to about 200° C., however, higher or lower temperatures may be employed if desired.

The time of exposure of the powdered mass to the hot gas will be relatively short in order to prevent damage to the polymer particles. If the initial temperature of the gas is approximately 160° C. the contact time will usually vary, for example, between two to three seconds. The use of lower temperatures will ordinarily extend the contact time to much longer periods.

At the conclusion of the sintering step the polymer particles may be collected by any of the suitable methods described hereinabove for the collection of the polymer grains at the conclusion of the drying operation, e. g., by withdrawing the gas containing the polymer particles to a settling chamber and allowing the particles to settle to the bottom where they are collected as a finely divided, dry powder.

The products obtained by the combined disintegration-surface sintering process described above are far superior in their properties to the polymers obtained by the usual methods. The final product, for example, has an appreciably smaller bulk volume, is blown about but little if at all and can readily be sifted; it may even be mixed homogeneously by hand with plasticizers, with which it does not gelatinize at all at room temperatures.

The accompanying drawing illustrates more or less diagrammatically a typical apparatus that may be used in the operation of the claimed process. This diagram is given only as an example and should not be considered as limiting the invention in any way. The apparatus disclosed in Figure I consists mainly of a rotating drum 1 equipped with an inclined shaft and having radial vanes 15 attached to the inner wall, a hopper 2 for introducing the liquid-containing conglomerates of the polymer particles into the drum, a conduit or shaft 3 for introducing the drying gas into the said drum, conduit or shaft 4 for withdrawing the gas containing the suspended particles, and a ventilator or fan 5 for sucking the gas into settling chamber 6 which is equipped with an open air vent 12 and a door 14 for removing the powdered polymer. Figure II, which is a cross-sectional view of drum 1 taken along line II—II, illustrates the radial vanes 15 attached to the inner wall of the drum and a cover 11 for the rotating drum.

The apparatus of Figure I can also be used for the surface-sintering step. For this embodiment, the apparatus contains a stopper or valve 8 which can be turned to permit the introduction of hot gas through conduit 9 into drying shaft 10, and ventilator or fan 5 for drawing the hot gas into settling chamber 6.

In the operation of the apparatus shown in Figure I, the liquid-containing conglomerate is introduced into the drum 1 through hopper 2. The dry gas is then introduced into the drum through conduit 3. The gas containing the suspended particles is then removed from the drum through conduit 4 and drawn into settling chamber 6 by means of fan 5. In the event the particles are to be subjected to the surface-sintering step, valve 8 is opened and hot gas introduced into conduit 9 so that it will come in contact with the gas from conduit 4 and the mixture taken through drying shaft 10 and thence to the settling chamber 6.

To illustrate the manner in which the invention may be carried out the following examples are given. It is to be understood, however, that the examples are for the purpose of illustration and the invention is not to be regarded as being limited to any of the specific conditions cited therein.

*Example I*

An aqueous suspension of polyvinyl chloride was prepared by polymerizing monomeric vinyl chloride in an aqueous emulsion of pH8, 2 parts of sodium cetyl sulfate as emulsifying agent, and 1 part of potassium persulfate as the catalyst. About 200 parts of this suspension which contained about 33% by weight of polyvinyl chloride was mixed with sodium chloride to coagulate the latex. The mixture was subsequently filtered and the resulting wet cake of polyvinyl chloride introduced into a rotating drum equipped with an inclined shaft and having radial vanes attached to the inner wall. A current of air of approximately 80° C. was passed through the drum. The air containing the suspended polyvinyl chloride particles was sucked through into a settling chamber. The polyvinyl chloride collected at the bottom of the chamber was a finely powdered mass in which the separate polymer particles did not stick together and the said mass was very easily handled in the subsequent processing steps.

*Example II*

Wet cakes of polyvinyl chloride produced as in Example I were placed in the rotating drum described above and a current of air at 80° C. was passed through. The air containing the suspended fine polyvinyl chloride particles together with a current of air of much higher temperature was sucked through a drying shaft with the aid of a ventilator fitted at the end of the shaft. The temperature at the inlet of the drying shaft amounted to approximately 160° C., at the outlet to 90° C. to 100° C. The polyvinyl chloride remained in the drying shaft for about two to three seconds which caused surface sintering. The resulting product was easily utilized in the subsequent processing step.

*Example III*

Water-containing conglomerates of the following polymers are disintegrated by the procedure described in Example II, polymethyl methacrylate, polyacrylonitrile, copolymer of 10 parts vinyl chloride and 90 parts vinylidene chloride, polybutyl methacrylate, and a copolymer of 50 parts methyl methacrylate and 50 parts acrylonitrile. In each case the products are obtained in a finely powdered mass which is easily processed.

We claim as our invention:

1. A process for the disintegration of liquid-containing conglomerates of polyvinylidene chloride particles which comprises introducing the said conglomerates into a rotating drum equipped with a slightly inclined shaft and having radial vanes attached to the inner wall, simultaneously passing a current of air at 80° C. over the mixture in the drum, and withdrawing the air containing the suspended polymer particles to a settling chamber where the particles are allowed to settle to the bottom and are collected as a finely divided, dry powder.

2. A proces for the disintegration of liquid-containing conglomerates of polyvinyl chloride particles which comprises introducing the said conglomerates into a rotating drum, simultaneously passing a current of air at a temperature of 80° C. over the mixture in the said drum, and withdrawing the air containing the suspended polyvinyl chloride powder to a settling chamber where the powder is allowed to settle to the bottom and collected as the desired product.

3. A process for the disintegration of liquid-containing conglomerates of polyvinyl chloride particles which comprises introducing the said conglomerates into a rotating drum, simultaneously passing a current of air at a temperature between 50° C. and 90° C. over the mixture in the said drum, withdrawing the air containing the suspended fine polyvinyl chloride powder, mixing the withdrawn air with another current of air of much higher temperature and drawing the resulting air mixture through a drying shaft to a settling chamber where the particles are allowed to settle to the bottom and are collected as a finely divided, dry powder, the temperature of the air mixture at the inlet of the drying shaft being about 160° C. and at the outlet of drying shaft being between 90° C. and 100° C. and the polyvinyl chloride powder being allowed to remain in the drying shaft for only two to three seconds.

4. A process for the disintegration of liquid-containing conglomerates of particles of a thermoplastic polymer having elongation at break of less than 100% which comprises introducing the said conglomerates into a rotating drum equipped with a slightly inclined shaft and having radial vanes attached to the inner wall, simultaneously passing a current of air at 80° C. over the mixture in the drum, and withdrawing the air containing the suspended polymer particles to a settling chamber where the particles are allowed to settle to the bottom and are collected as a finely divided, dry powder.

5. A process for the disintegration of liquid-containing conglomerates of particles of a thermoplastic polymer having elongation at break of less than 100% which comprises introducing said conglomerates into a rotating drum, simultaneously passing a current of air at a temperature between 50° C. and 90° C. over the mixture in the drum, and withdrawing the air containing the suspended polymer particles to a settling chamber where the particles are allowed to settle to the bottom and are collected as a finely divided, dry powder.

6. A process for the disintegration of liquid-containing conglomerates of particles of a thermoplastic polymer having elongation at break of less than 100% which comprises introducing the said conglomerates into a rotating drum, simultaneously passing a current of air at a temperature between 50° C. and 90° C. over the mixture in the drum, withdrawing the air containing the suspended polymer particles, mixing the withdrawn air with another current of air of much higher temperature and drawing the resulting air mixture through a drying shaft to a settling chamber where the particles are allowed to settle to the bottom and are collected as a finely divided, dry powder, the temperature of the air mixture at the inlet of the drying shaft being about 160° C. and at the outlet of the drying shaft being between 90° C. and 100° C. and the fine polymer particles being allowed to remain in the drying shaft for only two or three seconds.

7. A process for disintegrating liquid-containing conglomerates of particles of a thermoplastic polymer having elongation at break of less than 100% which comprises subjecting the said conglomerates to a continuous mechanical agitation treatment to cause a physical disintegration of the conglomerates into smaller polymer particles, simultaneously passing a current of gas at a temperature sufficiently high to cause volatilization of the liquid but below the fusible temperature of the said polymer particles over the particles to absorb substantially all of the liquid contained on the surface of the said polymer particles, withdrawing the gas containing the suspended polymer particles to a settling chamber where the particles are allowed to settle to the bottom and are collected as a dry, finely divided powder.

8. A process for disintegrating liquid-containing conglomerates of particles of a thermoplastic polymer having elongation at break of less than 100% which comprises subjecting the said conglomerates to a continuous mechanical agitation treatment to cause a physical disintegration of the conglomerates into smaller polymer particles, simultaneously passing a current of gas at a temperature sufficiently high to cause volatilization of the liquid but below the fusible temperature of the polymer particles over the particles to absorb the liquid contained on the surface of the said polymer particles, withdrawing the gas containing the suspended polymer particles, contacting this gas with another current of gas which is at such a temperature that the temperature of the resulting gas mixture is about 160° C. for about 2 to 3 seconds, and then withdrawing the gas mixture to a settling chamber where the particles are allowed to settle to the bottom and collected as a finely divided, dry powder.

9. A process for the disintegration of liquid-containing conglomerates of particles of a thermoplastic polymer having elongation at break of less than 100% which comprises subjecting the said conglomerates to a continuous mechanical agitation treatment to cause a physical disintegration of the conglomerates into smaller polymer particles, simultaneously removing the liquid on the surface of the polymer particles, removing the polymer particles and subjecting them to a temperature between 160° C. and 200° C. for a period up to three seconds, and then collecting the particles as a finely divided, dry powder.

10. A process for disintegrating liquid-containing conglomerates of particles of a thermoplastic polymer having elongation at break of less than 100% which comprises subjecting the said conglomerates to a continuous mechanical agitation treatment to cause a physical disintegration of the conglomerates into smaller polymer particles, simultaneously removing the liquid on the surface of the polymer particles and collecting the said particles as a finely divided, dry powder.

11. A process for converting liquid-containing conglomerates of particles of a thermoplastic polymer of vinyl chloride into dry, finely divided powder which comprises subjecting the said conglomerates to a continuous mechanical agitation treatment to cause a physical disintegration of the said conglomerates into smaller particles, simultaneously passing a current of gas at a temperature between 50° C. and 90° C. over the particles to absorb the liquid contained on the surface thereof, withdrawing the gas containing the suspended polymer particles, contacting this gas for a few seconds with another current of gas which is maintained at a temperature between 160° C. and 200° C., and then withdrawing the combined gas mixture to a settling chamber where the polymer particles are allowed to settle to the bottom and collected as a finely divided dry powder.

12. A process for converting liquid-containing conglomerates of particles of a thermoplastic polymer of a vinyl halide into dry, finely divided powder which comprises subjecting the said conglomerates to a continuous mechanical agitation treatment to cause a physical disintegration of the conglomerates into smaller polymer particles, simultaneously passing a current of gas at a temperature sufficiently high to cause volatilization of the liquid on the surface of the particles but below the fusible temperature of the polymer particles over the particles to absorb the said liquid contained on the surface thereof, withdrawing the gas containing the suspended polymer particles, contacting this gas for a few seconds with another current of gas maintained at a temperature above about 160° C., and then withdrawing the combined gas mixture to a settling chamber wherein the particles are allowed to settle to the bottom and are collected as a finely divided dry powder.

13. A process for disintegrating liquid-containing conglomerates of particles of a thermoplastic polymer having an elongation at break of less than 100%, which comprises subjecting the said conglomerates to a continuous agitation treatment to cause a physical disintegration of the conglomerates into smaller particles, simultaneously passing a current of hot gas over the particles to absorb the liquid contained on the surface of the said polymer particles wherein the dried polymer particles then become suspended in the said gas, conducting the gas containing the suspended polymer particles to a drying shaft the inlet temperature of which is maintained at a temperature above about 160° C., withdrawing the gas from the shaft within a few seconds and conducting it to a settling chamber where the suspended polymer particles are allowed to settle to the bottom and are collected as a finely divided dry powder.

14. A process as defined in claim 13 wherein the disintegration is accomplished in a rotating drum equipped with a slightly inclined shaft and having radial vanes attached to the inner wall.

15. A process as defined in claim 13 wherein the temperature employed during the mechanical agitation treatment is maintained between 50° C. and 90° C.

16. A process as defined in claim 13 wherein the temperature at the inlet of the drying shaft varies from 160° C. to 200° C.

17. A process as defined in claim 13 wherein the thermoplastic polymer is a polymer of vinyl chloride.

18. A process as defined in claim 13 wherein the thermoplastic polymer is a member of the group consisting of thermoplastic polymers of the vinylidene halides, the alkyl esters of acrylic acid and alpha-alkyl substituted acrylic acids, the vinyl esters of the acrylic acid and alpha-alkyl substituted acrylic acids, the vinyl esters of the halogen acids, the vinyl esters of hydrocyanic acid, and styrene.

19. A process for disintegrating liquid-containing conglomerates of particles of a thermoplastic polymer of vinyl chloride having an elongation at break of less than 100% which comprises subjecting the said conglomerates to a continuous mechanical agitation treatment to cause a physical disintegration of the conglomerates into smaller particles, simultaneously passing a current of air at a temperature sufficiently high to cause volatilization of the liquid but below the fusible temperature of the said polymer particles over the particles to absorb the liquid contained on the surface of the said polymer particles, withdrawing the gas containing the suspended polymer particles to a settling chamber where the particles are allowed to settle to the bottom and are collected as a dry, finely-divided powder.

20. The process as defined in claim 19 wherein the temperature employed during the mechanical agitation treatment is maintained between 50° C. and 90° C.

WILLEM LEENDERT JOHANNES DE NIE.
RUDOLF HERMAN METTIVIER MEIJER.

REFERENCES CITED

The following references are of record in the file of this patent:

UNITED STATES PATENTS

| Number | Name | Date |
|---|---|---|
| 486,806 | Batcheller | Nov. 22, 1892 |
| 1,729,424 | Harshaw | Sept. 24, 1929 |
| 1,771,139 | Novotny | July 22, 1930 |
| 1,771,140 | Novotny | July 22, 1930 |
| 1,934,930 | Kent | Nov. 14, 1933 |
| 2,019,363 | Schulz | Oct. 29, 1935 |
| 2,101,635 | Bender | Dec. 7, 1937 |
| 2,371,868 | Berg | Mar. 20, 1945 |